Inventors
ALLAN P. COLBURN
BARNETT F. DODGE

ALLAN P. COLBURN
BARNETT F. DODGE

Inventors
ALLAN P. COLBURN
BARNETT F. DODGE
By Ralph L Chappell
Attorney

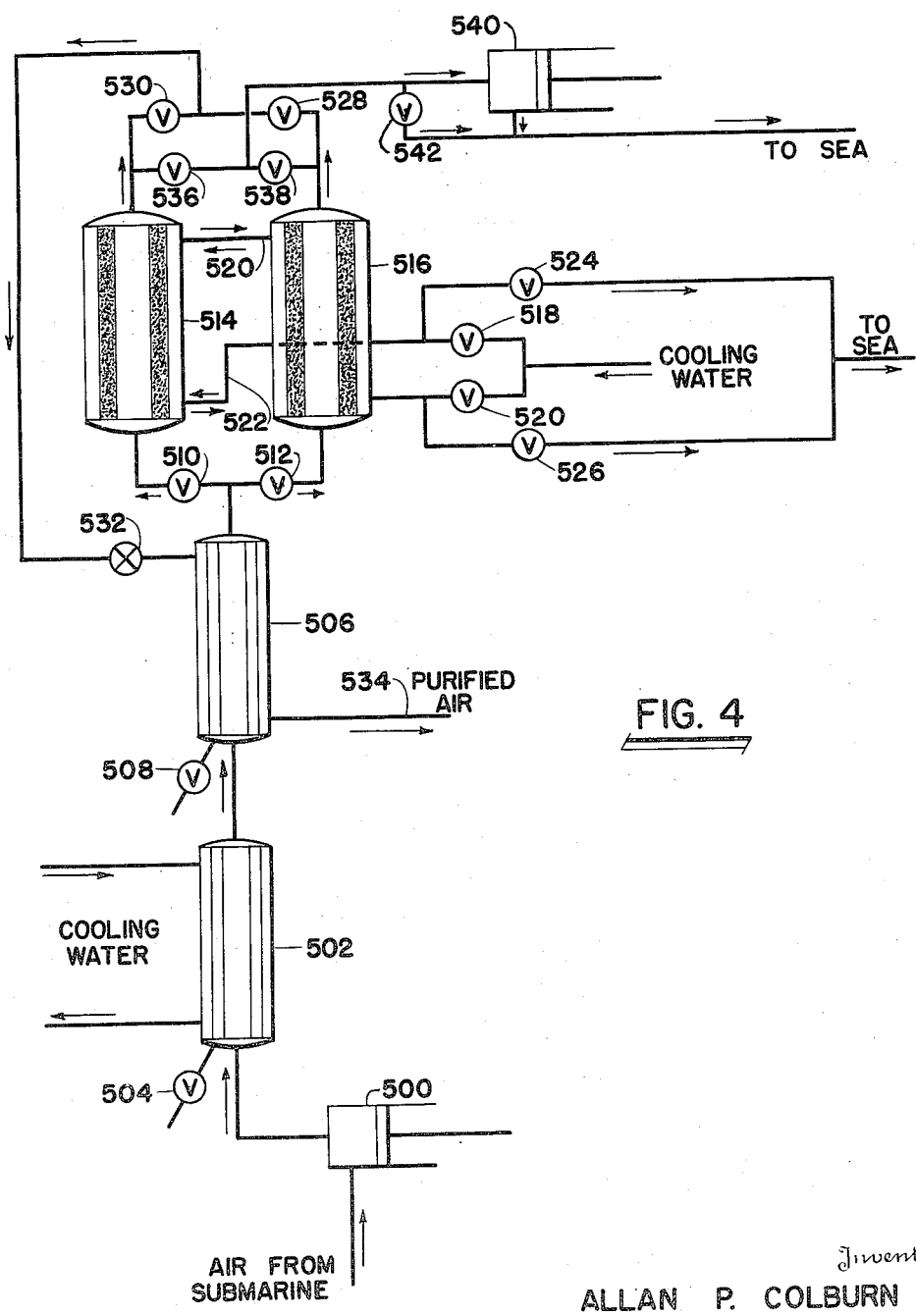

Patented Mar. 13, 1951

2,545,194

UNITED STATES PATENT OFFICE 2,545,194

ADSORPTION PROCESS FOR REMOVAL OF CARBON DIOXIDE FROM THE ATMOSPHERE OF A SUBMARINE

Allan P. Colburn, Newark, Del., and Barnett F. Dodge, Hamden, Conn., assignors to the United States of America as represented by the Secretary of the Navy Application November 14, 1945, Serial No. 628,605

1 Claim. (Cl. 183—114.2)

This invention relates to a process of purifying air. Further it relates to a process of purifying air from a confined space and in particular to a process of purifying the atmosphere of a submarine by a method of adsorption.

Reference is hereby made to the applicants' copending applications Serial Number 628,606, filed November 14, 1945, and Serial Number 629,162, filed November 16, 1945, both of which define analogous processes of purifying air.

At present it is customary to purify the atmosphere of a submarine by chemical reaction of the carbon dioxide in the impure atmosphere with an hydroxide. The hydroxide most commonly used today is that of lithium which is placed around on shelves or in canisters, within the submarine so that the atmosphere in the submarine comes into contact with this compound. This is a very efficient process, removing practically all of the carbon dioxide while the hydroxide is active; but it has a limitation of lasting only a certain number of hours. This fact necessitates the carrying of an extra supply of the salt in order to have a sufficient quantity available for a long cruise.

The present invention has been made with the idea of overcoming this limitation and it has as one object to provide a process to remove carbon dioxide by a method of adsorption.

Another object is to provide a process which is continually operable and which does not depend on the reaction of the carbon dioxide with a chemical compound for its removal.

Still a further object of the invention is to provide a process which is efficient in operation and in which the power consumption is relatively low and the space requirement is small.

With these objects in view, and in order to have a clearer understanding of the preferred embodiment of the adsorption process and of the several modifications thereof, reference is now made to the drawings which are submitted for purposes of exposition and in which:

Figure 1 represents a flow chart of process 2a.

Figure 4 is a flow chart for process 2d.

Process 2a is similar to process 1a in the applicants' copending application No. 629,162. The difference thereover resides in the fact that the oxygen evaporators are equipped with tubes containing activated carbon inside thereof. As in process 1a, these adsorbers are arranged in a pair so that after a certain period of time, the evaporators are switched and the carbon that was nearly saturated with the carbon dioxide is reactivated by heat and evacuating. Since the heat of adsorption of carbon dioxide is at least double the heat of condensation on a plain surface, this process requires more refrigeration than that of 1a. However, it has the advantage over this latter process in that the carbon dioxide deposition is definitely localized and the inevitable trouble of handling a finely divided solid in a gas stream is avoided.

Figure 1:
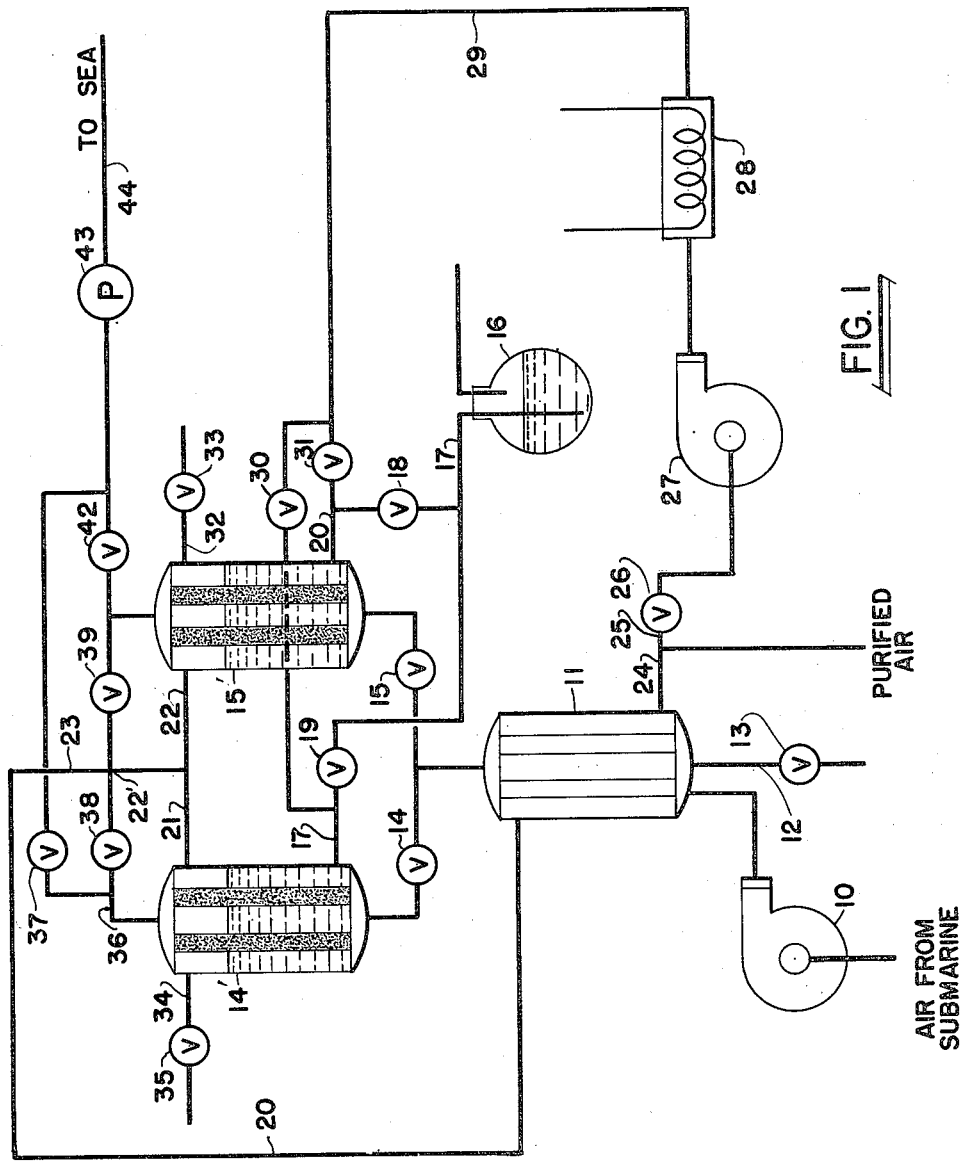

Referring now to Figure 1 of the drawings, blower 10 removes the impure air from the submarine and forces it through forecooler 11, which is cooled by the returning purified air. The moisture contained in the impure air is condensed in this forecooler and is drained off as water by pipe 12 through valve 13. The dried air then passes via valves 14 or 15 to either one of a pair of oxygen evaporators 14' or 15' in which is shown activated carbon in the interior of the tubes. These oxygen evaporators are cooled by the evaporation of liquid oxygen which is supplied to them from liquid oxygen storage via either valves 18 or 19, as the case may be. The impure air passing through the tubes of these evaporators loses its content of carbon dioxide by a freezing action. The thereby purified air is withdrawn through either valves 38 or 39 and cross-connection 22' by pipe 23. Thence it returns to forecooler 11 where it acts as a refrigerating medium for the oncoming impure air. The purified air passes from the forecooler by pipe 24 and is returned to the atmosphere of the submarine. In the evaporation of oxygen in the evaporators, the gaseous oxygen is withdrawn through pipe 21 or 22 and is admixed with the purified air coming from either one of these evaporators at cross 22'. This builds up the oxygen content of the purified air so that a comfortable breathing mixture is produced. The carbon dioxide in either one of the evaporators is removed therefrom by the application of heat to the solidified carbon dioxide in the adsorbers and by evacuation therefrom. It passes via either valves 37 or 42 to compressor 43, whence it is discharged to the sea. After the purified air leaves forecooler 11, a part of it is taken via pipe 25, valve 26 and blower 27 which forces the air so taken through an electric air heater to the thawing line 29 which conducts this heated air via either valves 30 or 31 to the other one of the pair of oxygen evaporators wherein it passes exteriorly of the tubes in the oxygen evaporator exchanging its heat to the solidified carbon dioxide adsorber by the granular carbon on the interior of the tubes of the evaporator whereby the solid carbon dioxide is evaporated and the granular carbon is reactivated. The thrawing air passes thence by either pipes 32 or 34 and valves 33 or 35 back to the atmosphere of the confined space.

Figure 2:
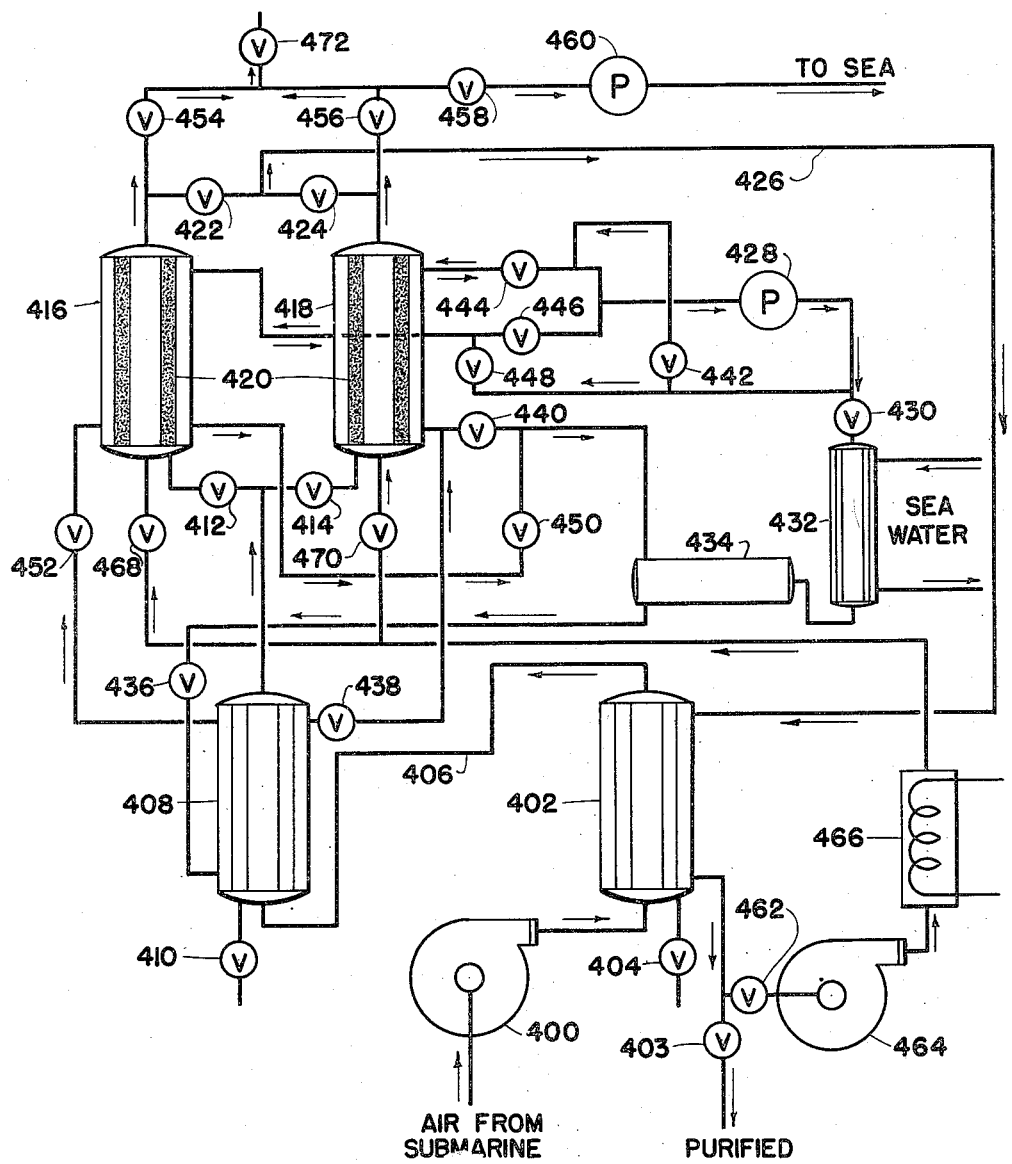
Figure 2 is a flow chart of process 2b showing the carbon adsorbers in the train of flow.
Figure 3:
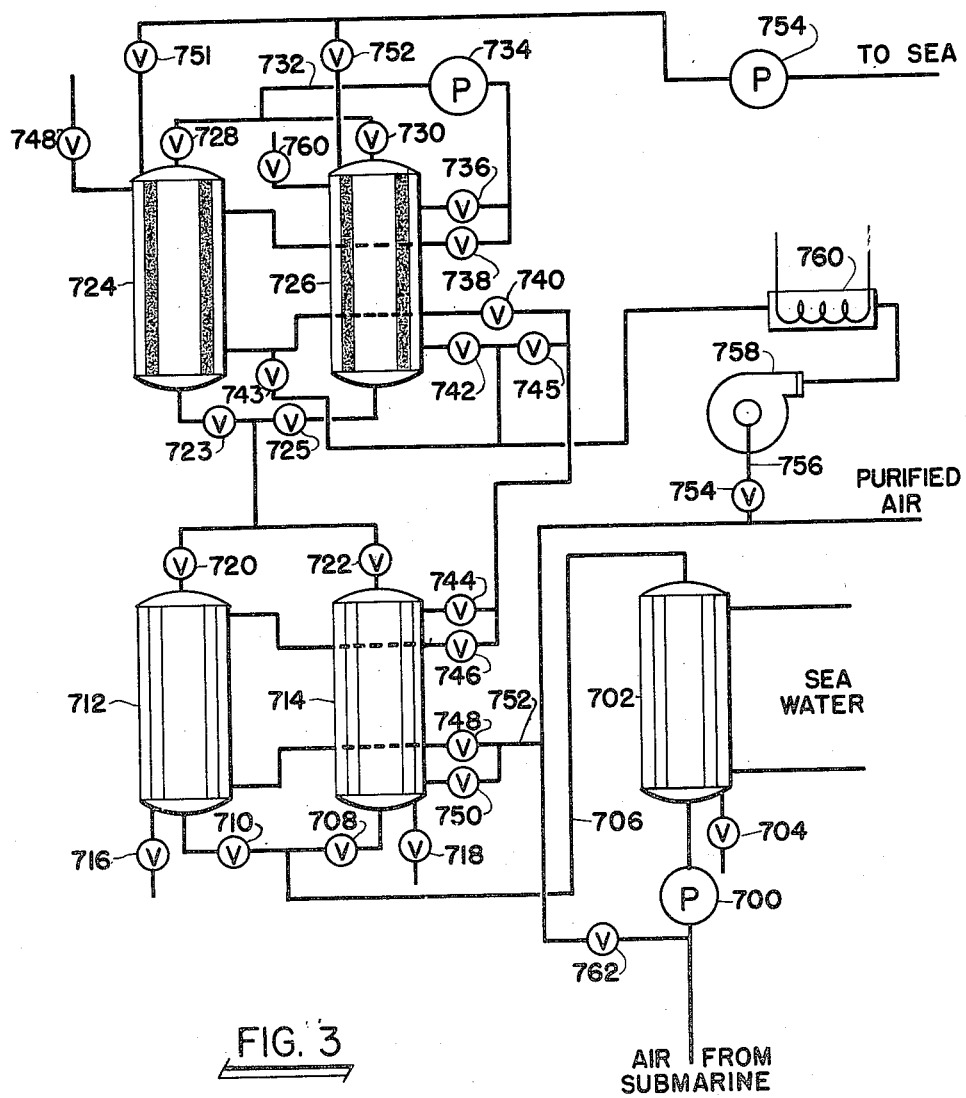
Figure 3 is a flow chart of process 2c. Here also the carbon dioxide is removed by adsorption on carbon.

In process 2b which is illustrated by Figure 2, water vapor is removed in the forecooler refrigerated by returning purified air and in a dehydrator cooled by evaporating Freon. The air then enters a pair of switching adsorbers where the carbon dioxide is removed by active carbon. With a 3-stage Freon compression system, temperatures of $-100°$ F. are maintained at the exit from the adsorbers and this is sufficiently low to bring about substantially complete removal of the carbon dioxide from the gas stream until the carbon has adsorbed 15-20% of its weight of carbon dioxide. At this time the adsorbers are switched and the saturated one is used as a Freon condenser. The condensing Freon supplies the heat of vaporization of the carbon dioxide and the pressure on the carbon dioxide is lowered by a vacuum pump so that the major portion is removed with reasonable speed. In other words the adsorbers are used alternately as Freon evaporators and condensers. The additional Freon condensing capacity need is supplied by an ordinary shell-and-tube condenser cooled by sea water.

No use is made in this process of a refrigeration from liquid oxygen. The amount available from the 5 lbs. per hour required for breathing is such a small fraction of the total refrigeration requirement (about 15%) that the gain may be more than offset by the added complexity of the adsorbers. In fact one of the advantages of the carbon process is that the carbon dioxide can be removed at a temperature level where ordinary mechanical refrigeration may be used for heat pumping and the use of liquid oxygen dispensed with.

Referring to Figure 5, the atmosphere in the submarine is withdrawn by blower 400 which forces it into the base of forecooler 402 which is cooled by the returning purified air. A part of the vapor contained in the impure air is condensed here and is drained off through valve 404. The partially dry impure air passes thence via pipe 406 into dehydrator 408 which is cooled by liquid Freon. Here all of the contained moisture is condensed and is drained off through valve 410. The dried impure air passes thence by either valves 412 or 414 into the carbon adsorbers 416 or 418. These adsorbers are cooled to low temperature by the evaporation of Freon which is supplied to the particular adsorber via pipe and valves 438 or 452. Substantially all of the carbon dioxide is removed by these adsorbers up to the extent of say 20% of the weight of the granular carbon as shown at 420. When approximately this amount of carbon dioxide has been adsorbed that adsorber is cut off from the stream of the oncoming impure air and the other one is turned on. The pure air then passes via either valve 422 or 424 and line 426 to the forecooler 402 where it acts as a coolant to the oncoming impure air. The purified air in part passes thence by valve 403 to the submarine atmosphere. A part of the purified air is taken out via valve 462 and air blower 464 to be heated for carbon activating purposes. This blower forces the air through electric air heater 466 whence it passes through either valves 468 or 470 into the adsorbers 416 or 418. It passes through the carbon in these adsorbers applying heat to the carbon thereby reactivating it. This air then passes via valves 454 or 456 and valve 472 to the exhaust, and is returned to the atmosphere of the submarine.

When the carbon adsorbers are switched the solid carbon dioxide adsorbed on the carbon is evaporated by taking heat from the Freon gas. This condenses the Freon which is then returned to the Freon storage 434. The carbon dioxide is removed from either of the adsorbers via valves 454 and 456 and 458 by compressor 460 which discharges it into the sea.

The Freon circulating system comprises a compressor 428 which forces the compressed Freon via valve 430 through water cooled Freon condenser 432. The condensed Freon passes to Freon storage 434. It is withdrawn from this storage via valve 436 whence it passes to the base of dehydrator 408. It then passes from the dehydrator via valve 438 or 452 to either one of the adsorbers where by evaporation it cools the particular adsorber sufficiently to cause deposition of the carbon dioxide, contained in the dried air, on the adsorbing carbon. The evaporated Freon is removed from the adsorbers via either valves 444 or 446 by compressor 428. Gaseous Freon to supply heat for evaporation of the solid carbon dioxide enters one of the adsorbers via valves 448 or 446 and 444. Here it gives up heat to the solid carbon dioxide, which is evaporated thereby and the gaseous Freon is condensed to the liquid phase. The liquefied Freon returns from these adsorbers via valves 448 or 450 to the Freon storage 434.

In process 2c, the air to be purified is compressed to about 150 lbs. per square inch, cooled by sea water, dehydrated by cooling with return expanded air and then passed through another set of exchangers containing activated carbon where it is sufficiently cooled by expanded air to deposit substantially all of the carbon dioxide. The compressed, purified air is then expanded in an engine to produce the necessary refrigeration to maintain the low temperatures. Dehydrating and carbon dioxide exchangers are in duplicate to permit intermittent operating and deriming and thus maintain continuous operation without the necessity of making the exchangers large enough to store the entire accumulation of ice and carbon dioxide snow for the whole period of operation. This process positively removes the carbon dioxide from the impure air.

In the embodiment as shown by Figure 7 air compressor 700 draws the air from the submarine and forces it through after-cooler 702 which is cooled by sea water. Some moisture contained in the impure air is condensed in this aftercooler and the condensate is withdrawn through valve 704. The air then passes via pipe 706 and either valves 708 or 710 to the dehydrating exchangers 712 or 714 as the case may be. Dehydrating exchangers 712 and 714 are refrigerated by the returning expanding purified air. The dry impure air then passes via either valves 720 or 722 to the carbon dioxide exchangers 724 or 726, which contain activated carbon in the air passages. These exchangers are refrigerated by the expanding of the purified air. The carbon dioxide is removed from the air by freezing in these exchangers. The purified air then passes via valves 728 or 730 and pipe line 732 to the expander engine 734. From the expander the purified air then passes either by valves 736 or 738 to the cooling side of the exchangers 724 or 726. The purified air then passes via either valves 740 or 742 and valves 744 or 746 to the dehydrating exchangers. Thence it is withdrawn via valve 748 or 750 and pipe 752 and is returned in part as purified air to the submarine atmosphere. A part of this air may be withdrawn through valve 762 for recirculation in the event that the carbon dioxide removal has not been complete. Also a part is withdrawn via valve 754, pipe 756 and blower 758 for thawing purposes. Blower 758 forces the air through electric heater 760 and thence via either valves 742 or 743 to the carbon dioxide exchangers 724 and 726. In either one of these exchangers the thawing air melts the solidified carbon dioxide and is returned to the atmosphere of the submarine via valves 748 or 760. The carbon dioxide gas is withdrawn through either valves 751 or 752 by compressor 754 and is discharged to the sea.

In process 2d, the air pressure is increased to about 3000 lb. per square inch and the carbon dioxide is removed on activated carbon at room temperature and hence the heat of adsorption rejected to sea water. Compression and water cooling remove most of the water vapor in the air but it is still further reduced by cooling the ingoing high pressure air with return expanded air. The carbon dioxide is removed from the carbon by evacuation, the heat being supplied by sea water. Comparing this process with process 2b, it may be said that the latter operates on a temperature difference at constant pressure for adsorption and desorption of carbon dioxide, whereas process 2d operates on a pressure difference at substantially constant temperature.

Advantage of this process is that it is relatively simple, but its disadvantages are the high power requirement and the need to operate reciprocating machinery when submerged.

Referring to Figure 4, the air from the submarine is compressed by compressor 500 which forces it into the aftercooler 502. Here a part of the contained moisture is condensed and is drained off via valve 504. This aftercooler is cooled by sea water. The partially dried impure air passes thence to dehydrating exchanger 506 which is cooled by expanded, returning, purified air. Here all of the moisture contained in the impure air is condensed and drained off through valve 508. The dehydrated impure air then passes through either valve 510 or 512 to carbon adsorbers 514 or 516. These adsorbers are cooled by sea water which passes into them by either valves 518 or 520 and is returned by either valves 524 or 526 to the sea. The purified air passes out of these adsorbers into either valves 528 or 530 and is returned via expansion valve 532 to dehydrating exchanger 506 whence it is returned to the submarine atmosphere via pipe 534. The adsorbed carbon dioxide in either one of the carbon adsorbers is withdrawn with a compressor and vacuum pump 540 via either valves 536 or 538, or it may pass via valves 536 or 538 and valve 542 to the sea.

What is claimed is:

A process for purifying by refrigeration and adsorption, air containing moisture and carbon dioxide, wherein said air is an atmosphere confined in a space, said process comprising the steps of cooling said air to a temperature sufficiently low to condense the contained moisture; removing the carbon dioxide contained in the substantially dried air by adsorption in an adsorbing medium in the following manner: passing the substantially dried air at a pressure of substantially three thousand pounds per square inch through the passes of one of a pair of adsorbers, cooling said passes by water, providing said passes with an adsorbing agent, then passing the heat of adsorption from said passes to said water; thereafter returning the purified air to said atmosphere; removing the adsorbed carbon dioxide from said space after evaporation thereof, and reactivating said adsorbing medium.

ALLAN P. COLBURN.
BARNETT F. DODGE.

REFERENCES CITED

The following references are of record in the file of this patent:

UNITED STATES PATENTS

| Number | Name | Date |
|---|---|---|
| 1,379,221 | Scott et al. | May 24, 1921 |
| 1,872,783 | Miller | Aug. 23, 1932 |
| 1,945,778 | Abbett et al. | Feb. 27, 1934 |
| 2,374,091 | Garrison | Apr. 17, 1945 |